United States Patent
Xiao et al.

(10) Patent No.: US 10,715,683 B2
(45) Date of Patent: Jul. 14, 2020

(54) PRINT QUALITY DIAGNOSIS

(71) Applicant: Hewlett-Packard Development Company, L.P., Spring, TX (US)

(72) Inventors: Zuguang Xiao, Indianapolis, IN (US); Richard E Maggard, Boise, ID (US); Amy Reibman, West Lafayette, IN (US); Mark Shaw, Boise, ID (US); Jan Allebach, West Lafayette, IN (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/462,708

(22) PCT Filed: Jan. 25, 2017

(86) PCT No.: PCT/US2017/014898
§ 371 (c)(1),
(2) Date: May 21, 2019

(87) PCT Pub. No.: WO2018/140001
PCT Pub. Date: Aug. 2, 2018

(65) Prior Publication Data
US 2020/0084320 A1    Mar. 12, 2020

(51) Int. Cl.
*G06F 3/12* (2006.01)
*H04N 1/00* (2006.01)
*H04N 1/047* (2006.01)
*H04N 1/407* (2006.01)

(52) U.S. Cl.
CPC ......... *H04N 1/00029* (2013.01); *H04N 1/047* (2013.01); *H04N 1/4074* (2013.01)

(58) Field of Classification Search
None
See application file for complete search history.

(56) References Cited

U.S. PATENT DOCUMENTS

| | | | |
|---|---|---|---|
| 6,377,758 B1 | 4/2002 | OuYang et al. | |
| 6,665,425 B1 | 12/2003 | Sampath et al. | |
| 7,209,599 B2 * | 4/2007 | Simske | H04N 1/4095 382/274 |
| 7,376,269 B2 | 5/2008 | Klassen et al. | |
| 7,783,122 B2 | 8/2010 | Wu et al. | |

(Continued)

OTHER PUBLICATIONS

Pedersen, M., et al, Image Quality Metrics for the Evaluation of Print Quality, Dec. 21, 2010, SPIE-IS&T vol. 7867 ~ 19 pages.

*Primary Examiner* — Henok Shiferaw
(74) *Attorney, Agent, or Firm* — Mannava & Kang

(57) ABSTRACT

In some examples, print quality diagnosis may include aligning corresponding characters between a scanned image of a printed physical medium aligned to a master image associated with generation of the printed physical medium to generate a common mask. Print quality diagnosis may further include determining, for each character of the scanned image, an average value associated with pixels within the common mask, and determining, for each corresponding character of the master image, the average value associated with pixels within the common mask. Further, print quality diagnosis may include determining, for each character of the common mask, a metric between the average values associated with the corresponding characters in the scanned and master images.

14 Claims, 18 Drawing Sheets

(56) References Cited

U.S. PATENT DOCUMENTS

| | | |
|---|---|---|
| 8,077,358 B2 | 12/2011 | Banton et al. |
| 8,150,106 B2 | 4/2012 | Wu et al. |
| 8,451,504 B2 | 5/2013 | Xu et al. |
| 8,506,038 B2 | 8/2013 | Mizes et al. |
| 8,761,454 B2 | 6/2014 | Berkovich et al. |
| 8,804,157 B2 | 8/2014 | Bockus et al. |
| 9,533,513 B1 | 1/2017 | Qian |
| 2001/0016054 A1 | 8/2001 | Banker et al. |
| 2015/0063889 A1* | 3/2015 | Kojima ................. G03G 15/36 399/394 |

* cited by examiner $$I_x = I * \begin{bmatrix} -1 & 0 & 1 \end{bmatrix}; I_y = I * \begin{bmatrix} -1 & 0 & 1 \end{bmatrix}';$$

$$I_x I_y = I_x \cdot I_y;$$

$$I_x^2 = I_x^2 * G; \quad I_y^2 = I_y^2 * G; \quad I_x I_y = I_x I_y * G;$$

$$CSF(x, y) = (I_x^2 \cdot I_y^2 - (I_x I_y)^2) - k \cdot (I_x^2 + I_y^2)^2$$

FIG. 4 and put
from Th and put
from Th

```
┌─────────────────────────────────────────────────────┐
│ ALIGN CORRESPONDING CHARACTERS BETWEEN A SCANNED    │
│ IMAGE OF A PRINTED PHYSICAL MEDIUM ALIGNED TO A     │
│ MASTER IMAGE ASSOCIATED WITH GENERATION OF THE      │
│ PRINTED PHYSICAL MEDIUM TO GENERATE A COMMON MASK   │
│                        1702                         │
└─────────────────────────────────────────────────────┘
                           │
                           ▼
┌─────────────────────────────────────────────────────┐
│ DETERMINE, FOR EACH CHARACTER OF THE SCANNED IMAGE, │
│ AN AVERAGE VALUE ASSOCIATED WITH PIXELS WITHIN THE  │
│ COMMON MASK, AND DETERMINING, FOR EACH CORRESPONDING│
│ CHARACTER OF THE MASTER IMAGE, THE AVERAGE VALUE    │
│ ASSOCIATED WITH PIXELS WITHIN THE COMMON MASK       │
│                        1704                         │
└─────────────────────────────────────────────────────┘
                           │
                           ▼
┌─────────────────────────────────────────────────────┐
│ DETERMINE, FOR EACH CHARACTER OF THE COMMON MASK, A │
│ METRIC BETWEEN THE AVERAGE VALUES ASSOCIATED WITH   │
│ THE CORRESPONDING CHARACTERS IN THE SCANNED AND     │
│ MASTER IMAGES                                        │
│                        1706                         │
└─────────────────────────────────────────────────────┘
                           │
                           ▼
┌─────────────────────────────────────────────────────┐
│ DIVIDE THE PRINTED PHYSICAL MEDIUM INTO A PLURALITY │
│ OF SECTIONS                                          │
│                        1708                         │
└─────────────────────────────────────────────────────┘
                           │
                           ▼
┌─────────────────────────────────────────────────────┐
│ GENERATE, FOR EACH SECTION OF THE PLURALITY OF      │
│ SECTIONS, A HISTOGRAM OF THE DETERMINED METRICS     │
│                        1710                         │
└─────────────────────────────────────────────────────┘
                           │
                           ▼
┌─────────────────────────────────────────────────────┐
│ ANALYZE THE HISTOGRAM OF THE DETERMINED METRICS FOR │
│ A SECTION OF THE PLURALITY OF SECTIONS TO DIAGNOSE  │
│ PRINT QUALITY OF THE SECTION                         │
│                        1712                         │
└─────────────────────────────────────────────────────┘
```

FIG. 17

PRINT QUALITY DIAGNOSIS

BACKGROUND

A printing device, such as a printer, multifunction printer, and/or other such devices may be described as a peripheral which is used to make a persistent human readable representation of graphics or text on physical media such as paper. A printing device may include various components to move the physical media from a first location, such as an input tray, to a second location, such as an output tray.

BRIEF DESCRIPTION OF DRAWINGS

Features of the present disclosure are illustrated by way of example and not limited in the following figure(s), in which like numerals indicate like elements, in which:

FIG. 4 illustrates Harris Corners for image registration for the print quality diagnosis apparatus of FIG. 1, according to an example of the present disclosure;

FIG. 9A illustrates text before alignment, and FIG. 9B illustrates text after alignment for the text fading detection of FIG. 8 for the print quality diagnosis apparatus of FIG. 1, according to an example of the present disclosure;

FIG. 17 illustrates a flowchart of a method for print quality diagnosis, according to an example of the present disclosure.

DETAILED DESCRIPTION

Figure 1:
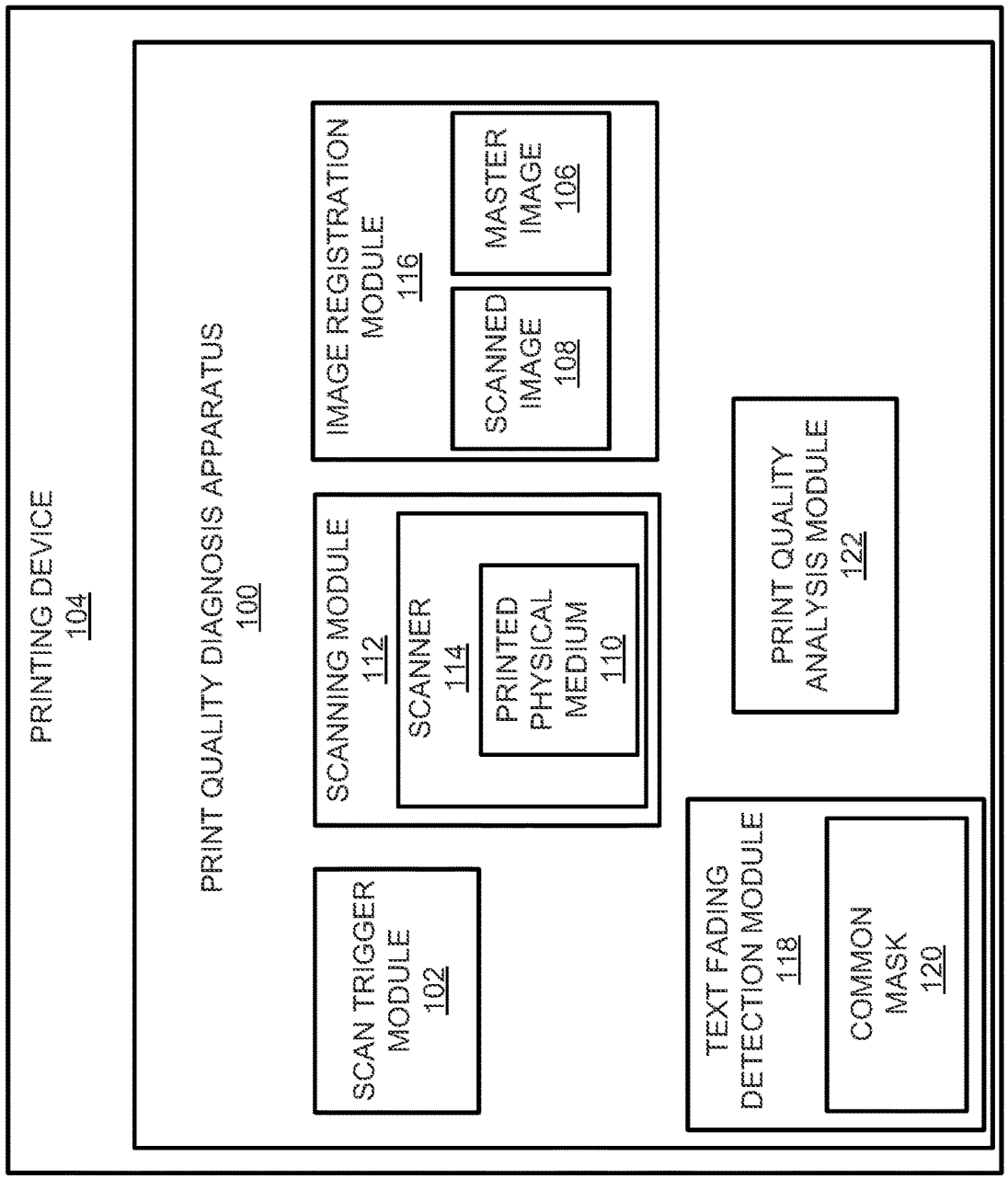
FIG. 1 illustrates a layout of a print quality diagnosis apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A print quality diagnosis apparatus, a method for print quality diagnosis, and a non-transitory computer readable medium having stored thereon machine readable instructions to provide print quality diagnosis are disclosed herein. The apparatus, method, and non-transitory computer readable medium disclosed herein provide for diagnosis of a printing device based on a built-in scan bar, for example, at an output end of the printing device. Thus, physical media that is printed may be scanned by the scan bar to identify print defects such as banding, streaking, text fading, etc. The print defects may be identified by comparing the scanned physical medium to a master image. In this regard, an image of the scanned physical medium (also denoted "scanned image") may be initially aligned with an associated master image by implementing a feature based image registration technique. Further, text regions of the two aligned images may be extracted and compared to identify any print defects. For example, print defects may be identified by detecting text fading. In this regard, a text fading analysis technique may compare the color difference between two images, and the mean value of the color difference distribution may be used as an indicator of the degree of the text fading (where the text fading level is positively correlated with the mean value). In response to a determination that the print quality has dropped below a specified print quality threshold (i.e., based on the identification of print defects), a service call may be scheduled for the printing device.

For the apparatus, method, and non-transitory computer readable medium disclosed herein, a text fading level may be used to determine an amount of toner remaining for each toner cartridge of the printing device (e.g., each cyan (C), magenta (M), yellow (Y), and key(K) toner cartridge). Other types of defects that may be detected in the text regions may include dark streaking, developer defects, banding, etc.

For the apparatus, method, and non-transitory computer readable medium disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry, such as one or more application specific integrated circuits (ASICs).

FIG. 1 illustrates a layout of a print quality diagnosis apparatus (hereinafter also referred to as "apparatus 100"), according to an example of the present disclosure.

Referring to FIG. 1, the apparatus 100 may include a scan trigger module 102 to forward a notice to a port of a printing device 104 specifying a length of a print job that is received. A copy of an image that is to be printed may be saved and denoted a master image 106. The master image 106 may be used for comparison and analysis of a scanned image 108 (i.e., a scanned image of a printed physical medium 110 based on the print job).

The scan trigger module 102 may generate a trigger, for example, upon initiation of the print job, and when the trigger is received by a scanning module 112, the scanning module 112 may initialize a scanner 114 to scan the printed physical medium 110 to generate the scanned image 108.

The apparatus 100 may include an image registration module 116 to align the scanned image 108 of the printed physical medium 110 to the master image 106 associated with generation of the printed physical medium 110.

The apparatus 100 may include a text fading detection module 118 to align corresponding characters between the aligned scanned and master images to generate a common mask 120. The text fading detection module 118 may determine, for each character of the scanned image 108, an average value (e.g., average L*a*b* as disclosed herein) associated with pixels within the common mask 120, and determine, for each corresponding character of the master image 106, the average value associated with pixels within the common mask 120. The text fading detection module 118 may determine, for each character of the common mask 120, a metric (e.g., an Euclidean distance as disclosed herein) between the average values associated with the corresponding characters in the scanned and master images.

The apparatus 100 may include a print quality analysis module 122 to analyze a histogram of determined metrics for characters of the common mask to diagnose print quality of the printed physical medium 110.

In some examples, the apparatus 100 may include or be provided as a component of a printing device. Alternatively, the apparatus 100 may be provided separately from the printing device. For example, the apparatus 100 may be provided as a component of a print server to control a printing operation of the printing device.

As will be appreciated, some examples of the apparatus 100 may be configured with more or fewer modules, where modules may be configured to perform more or fewer operations. Furthermore, in some examples, the modules may be implemented by execution of instructions with a processing resource to cause the processing resource to perform the corresponding operations.

Figure 2:
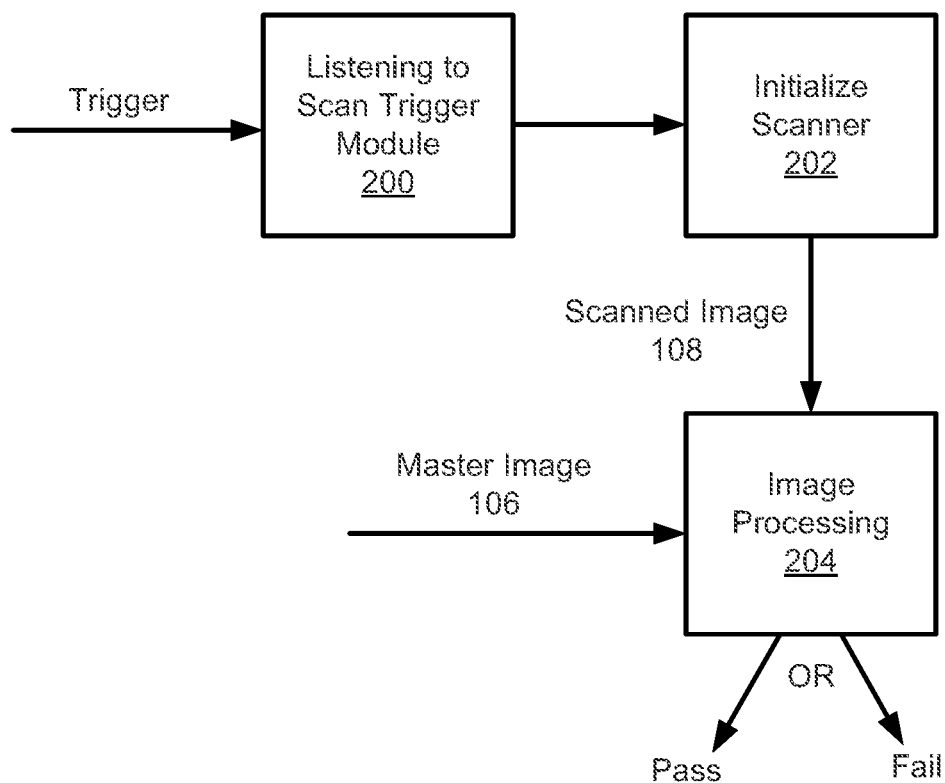
FIG. 2 illustrates a process flow for the print quality diagnosis apparatus of FIG. 1, according to an example of the present disclosure.

FIG. 2 illustrates a process flow for the apparatus 100, according to an example of the present disclosure.

Referring to FIG. 2, when the physical medium is to be printed, the scan trigger module 102 may forward a notice to the printing device 104 specifying a length of the print job. For example, the scan trigger module 102 may forward a notice to a port on the Internet Protocol (IP) address of the printing device 104 specifying a length of the print job. A copy of the image that is to be printed may also be saved based on the print job size, and denoted the master image 106. The master image 106 may be used for comparison and analysis of the scanned image 108 (i.e., the scanned image of the printed physical medium 110). A trigger as shown in FIG. 2 may be generated by the scan trigger module 102, for example, upon initiation of the print job. At block 200, when the trigger is received by the scanning module 112, at block 202 the scanning module 112 may initialize the scanner 114. Further, the scanning module 112 may wait for a "top of physical medium" trigger to begin scanning of the printed physical medium 110. At block 204, the scanned image 108 and the master image 106 may be processed by the image registration module 116 and the text fading detection module 118. The output of the image processing at block 204 may include a "pass" or "fail", or another indication. For example, a "pass" may be output if the results of the processing by the image registration module 116 and the text fading detection module 118 meet or exceed a print quality threshold, and otherwise, a "fail" may be output. For example, if the text fading detected by the text fading detection module 118 is below a specified text fading based threshold, a "pass" may be output. A classifier may be included at the output of block 204, where an output of the classifier may include a rank, or a pass/fail as shown in FIG. 2.

With reference to block 204, in the event that image processing takes longer than the physical medium throughput for multipage print jobs, such that as a current physical medium is being processed, a new physical medium arrives before the current physical medium is processed, the new physical medium (and any further physical media) may be omitted from processing or otherwise processed even after the print job is completed. Thus, scanned images for further physical media may be saved and processed by the image registration module 116 and the text fading detection module 118 during printing device downtime.

Figure 3:
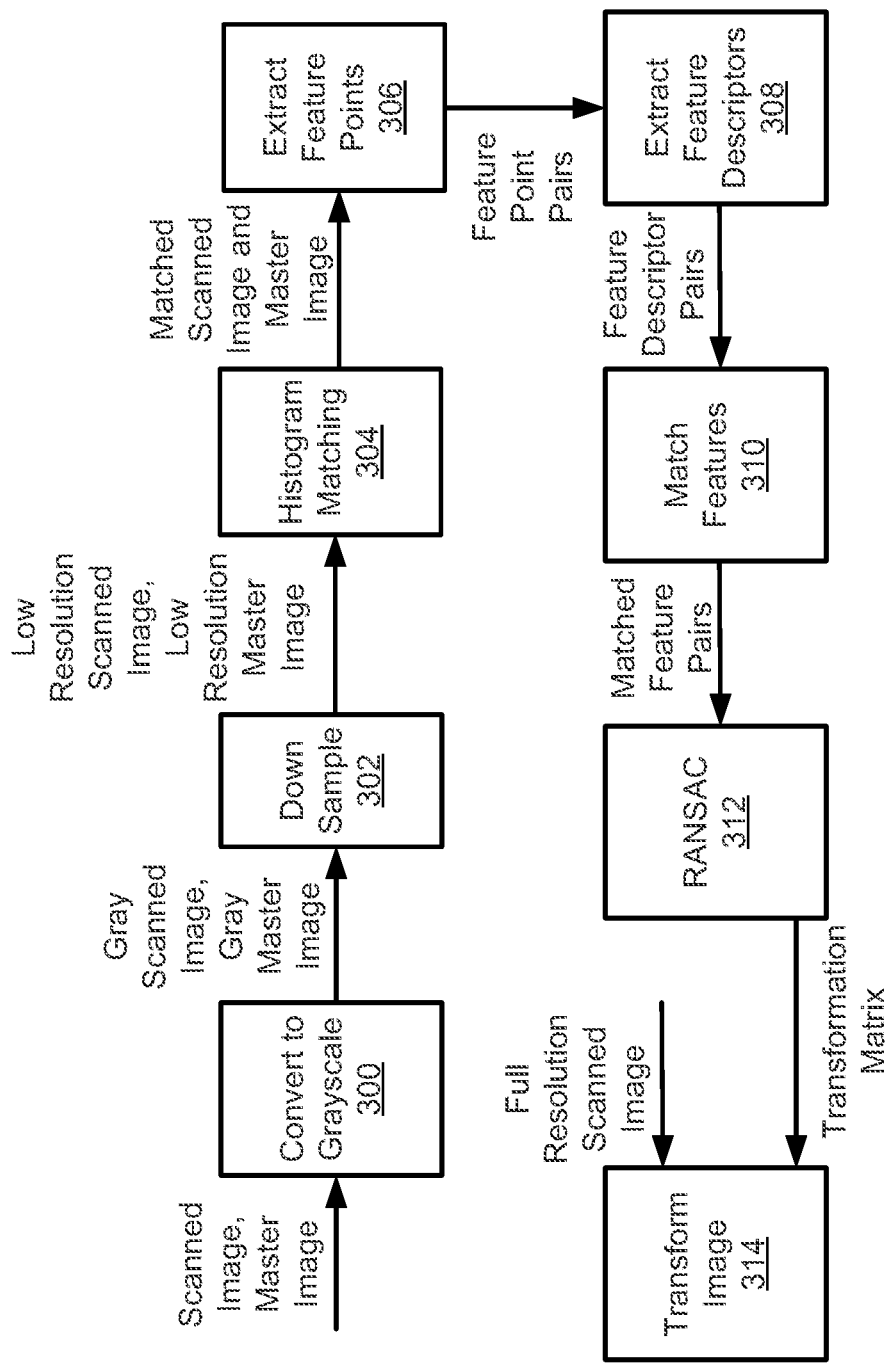
FIG. 3 illustrates an image registration flow for the print quality diagnosis apparatus of FIG. 1, according to an example of the present disclosure.

FIG. 3 illustrates an image registration flow for the apparatus 100, according to an example of the present disclosure.

With respect to image registration, the scanned image 108 may be subject to translation, scaling, skewing, etc. Accordingly, in order to compare the scanned image 108 with the master image 106, the scanned image 108 and the master image 106 may be spatially aligned. In this regard, the image registration module 116 may perform a global image registration of the scanned image 108 with the master image 106. The image registration module 116 may perform a feature based image registration by identifying feature points, for example corners, of objects in the scanned image 108 and the master image 106, and determining a best match between the features. The features may be used to establish point-to-point correspondence, and to estimate geometric transformation. The geometric transformation may be applied to the target image (e.g., the scanned image 108 or the master image 106) to spatially align with the source image (e.g., the other one of the scanned image 108 or the master image 106).

Referring to FIG. 3, with respect to image registration, at block 300, the image registration module 116 may convert the scanned image 108 (which may also be denoted "test image", and converted, if needed, to a red, green and blue (RGB) format) and the master image 106 to grayscale. For example, for grayscale, the L* component of the L*a*b* value of each pixel may be used.

At block 302, the image registration module 116 may downsample the scanned image 108 and the master image 106 to a lower resolution for faster processing. For example, downsampling may be performed by block averaging pixels, and retaining an average for each block of pixels.

At block 304, the image registration module 116 may perform histogram matching on the lower resolution scanned image 108 and the master image 106 to match the scanned image 108 to the master image 106. For example, histogram matching may be based on the cumulative distribution function, which may be described as the indefinite sum of the histogram. For example, histogram matching may include the matching of the histogram of one image to the histogram of another image. The matching may be performed by using the cumulative distribution function (CDF) of two images as follows. First, the CDF of a reference image may be determined (e.g., red curve (CDF1), the CDF of the image to be matched: blue curve (CDF2)). For each pixel value, x1 from 0 to 255 in CDF1, determine x2 in CDF2 so that it yields the same CDF. If this operation is performed for all points from 0 to 255, this operation will generate a look up table (LUT). The LUT may be applied to the image to be matched, that is if a pixel value x2 is read from the image to be matched, this pixel value is modified to x1. These operations may be performed once for a gray image, and for a color image, the same operations may be applied for each layer separately. After histogram matching, the colors of the image to be matched appear to be more similar to the reference image. Accordingly, since feature matching at block 310 (discussed below) may be based on comparing the pixel intensity, histogram matching at block 304 facilitates feature matching.

At block 306, the image registration module 116 may extract feature points from the low-resolution grayscale images, which have been matched. With respect to feature point extraction, according to an example, the Harris Corner technique may be implemented to detect feature points.

FIG. 4 illustrates Harris Corners for image registration for the apparatus 100, according to an example of the present disclosure. Referring to FIG. 4, for Harris Corners, I represents an input image, $I_x$ and $I_y$ represent the partial derivatives with respect to x and y, G represents a Gaussian filter, K represents a sensitivity factor, and CSF represents a corner strength function. In this regard, CSF(x, y) will be relatively large when there is a strong gradient along both the x direction and the y direction at point (x, y), and CSF(x, y) will be approximately equal to zero at a smooth area. Points whose corner strength is larger than a threshold may be selected as feature interest points.

With the feature points being extracted, at block 308 the image registration module 116 may extract feature descriptors at each feature point. Assuming that the scanned image 108 is skewed by a relatively small angle with respect to the master image 106, a block of pixels centered at each feature point may be extracted as the feature descriptors. For example, for each Harris Corner, a feature descriptor may represent a 10×10 block of pixels centered at that Harris Corner, as disclosed herein with reference to FIG. 4. Feature descriptors may include non-free feature descriptors such as scale-invariant feature transform (SIFT) and speeded up robust features (SURF), free feature descriptors such as binary robust independent elementary features (BRIEF), binary robust invariant scalable keypoints (BRISK), and fast retina keypoint (FREAK), and the block feature descriptor. For the "block" feature descriptor, all image points within a window centered at a key point may be extracted.

At block 310, the image registration module 116 may match the extracted feature descriptors, for example, by using Squared Sum of intensity Differences (SSD). For the SSD, for each descriptor in f1, the SSD relative to all the descriptors in f2 may be determined, and the minimum SSD descriptor in f2 may be identified, which is considered as a match to the descriptor in f1. For the SSD, f1 may represent the feature vector (array of features found) in the scanned image 108. Further, f2 may represent the feature vector found in the master image 106. However, the scanned image 108, which may be distorted with text fading, may have a different intensity with respect to the master image 106. In this regard, matching accuracy may be improved if the histogram of the scanned image 108 is matched with the master image 106 (e.g., at block 304) before the feature matching at block 310.

With respect to matching of the extracted feature descriptors, in the event that the scanned image 108 and the master image 106 include text (and no other graphics, etc.), a text character that is on the top of a scanned image 108 may be matched with the same text character that appears in the middle or bottom of the master image 106. In this regard, the spatial distance between the feature pairs being matched may be limited to eliminate such incorrect matching.

At block 312, the image registration module 116 may determine a geometric transformation matrix, such as affine, from the matched feature pairs. According to an example, the image registration module 116 may utilize techniques such as random sample consensus (RANSAC), maximum likelihood sample consensus (MLESAC), etc., to determine the geometric transformation matrix.

At block 314, the image registration module 116 may apply the transformation matrix to the full resolution scanned image 108 (instead of the low resolution scanned image 108) to generate a registered image. In this regard, the translation parameters in the transformation matrix may be scaled up by the downsampling rate before being applied. The registered image may include the scanned image 108 registered to the master image 106.

Figure 5:
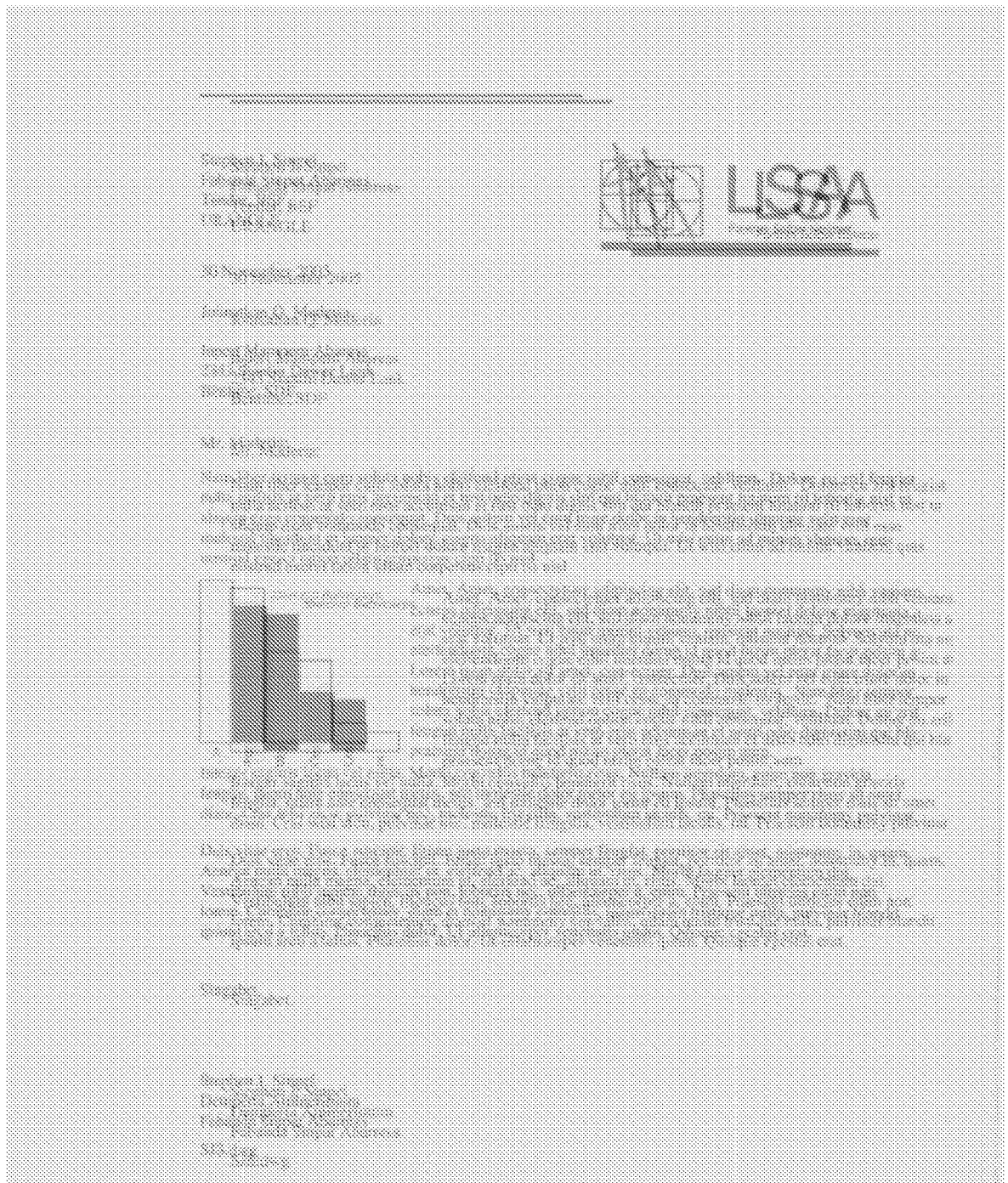
FIG. 5 illustrates a scanned image and a master image overlapping with each other for illustrating image registration for the print quality diagnosis apparatus of FIG. 1, according to an example of the present disclosure.

FIG. 5 illustrates a scanned image and a master image overlapping with each other for illustrating image registration for the apparatus 100, according to an example of the present disclosure.

For the example of FIG. 5, the scanned image 108 and the master image 106 may include a resolution of approximately 3200×2464 at a spatial resolution of 300 dpi. As shown in FIG. 5, the scanned image 108 and the master image 106 are misaligned both vertically and horizontally in the orientation of FIG. 5. Both the scanned image 108 and the master image 106 may be converted to grayscale and then downsampled by four in both vertical and horizontal directions in the orientation of FIG. 5. This results in two 800×600 low resolution images as shown side by side in FIG. 6, where FIG. 6 illustrates matched feature pairs for the scanned image and the master image of FIG. 5, according to an example of the present disclosure.

Figure 6:
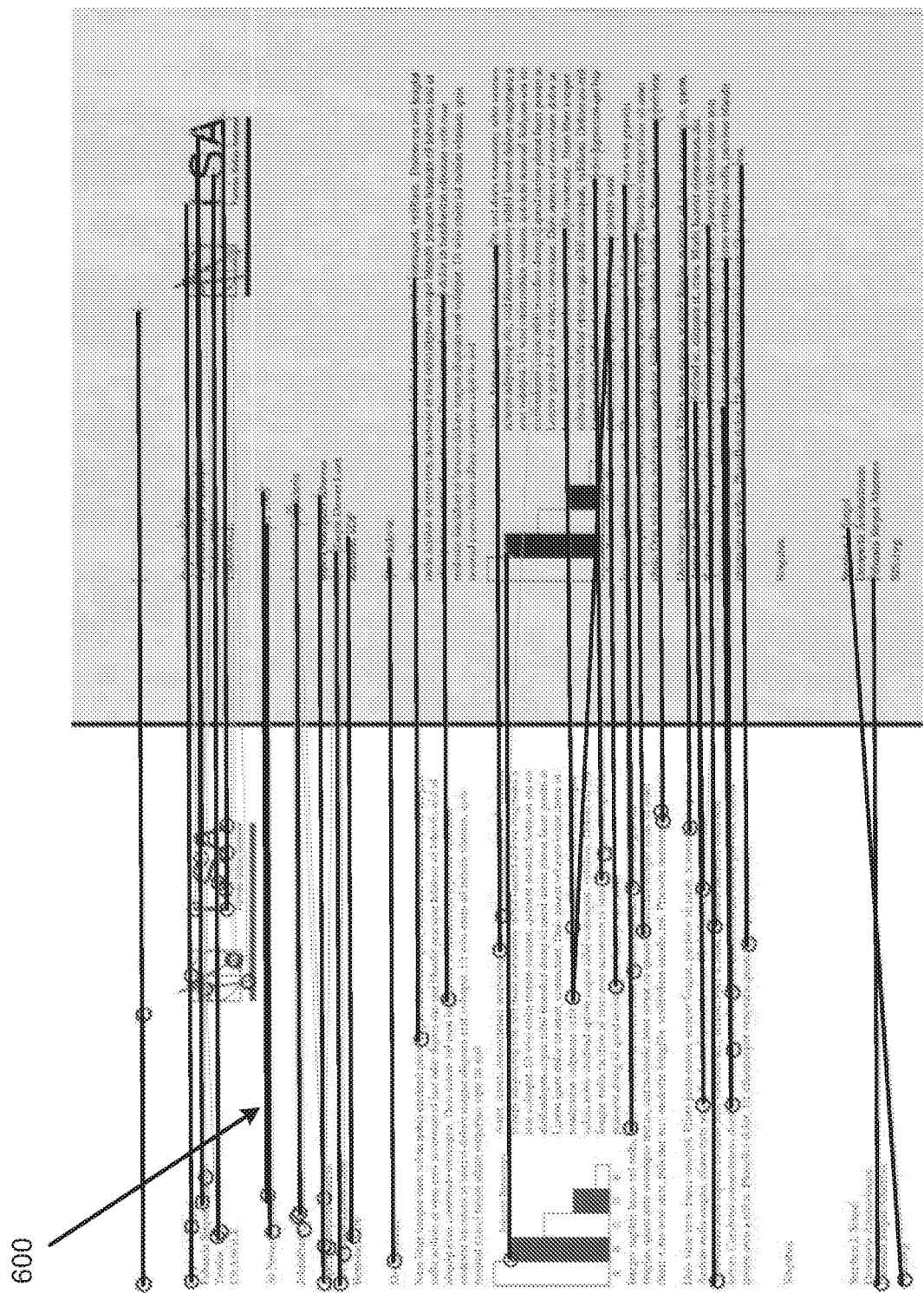
FIG. 6 illustrates matched feature pairs for the scanned image and the master image of FIG. 5, according to an example of the present disclosure.

For FIG. 6, the circles represent the feature points, and the feature pairs connected by straight lines are matched. As shown in FIG. 6, there are several mismatched pairs in the top half of the images at 600. Even with some mismatched feature pairs, these outliers may be rejected, for example, by the RANSAC or MLESAC techniques.

Figure 7:
FIG. 7 illustrates the scanned image overlapped with the master image of FIG. 5 after alignment for illustrating image registration for the print quality diagnosis apparatus of FIG. 1, according to an example of the present disclosure.

FIG. 7 illustrates the scanned image overlapped with the master image of FIG. 5 after alignment for illustrating image registration for the apparatus 100, according to an example of the present disclosure.

Referring to FIG. 7, even though the results of image registration for the scanned image 108 and the master image 106 appear to be acceptable, at 700, it can be seen that the overlapped images still include misalignment. In order to reduce this misalignment, the text fading detection module 118 may perform a localized text alignment.

With respect to text fading detection, one technique of text fading detection includes comparing a text faded physical medium with the paper white for each text character by determining a mean ΔE in L*a*b* color space. L*a*b* may represent an International Commission on Illumination (CIE) uniform color space, where L* represents lightness, a* represents red-green, and b* represents yellow-blue. This system is based on the an opponent color model for the human visual system. ΔE (or ΔE*ab) is the Euclidean distance between two points (two pixels) in the CIE L*a*b*color space, which is a perceptual uniform color space. ΔE reflects the perceptual difference of two colors as follows:

$$\Delta E_{ab}^* = \sqrt{(L_2^* - L_1^*)^2 + (a_2^* - a_1^*)^2 + (b_2^* - b_1^*)^2}$$

The above equation may represent a pixel-wise operation. A text character may include a plurality of pixels. Accordingly, the mean of the ΔE may be used to represent the average perceptual difference between two text characters. The histogram of all the characters of the entire physical medium will appear diverged if some of the text characters are faded. If there is no fading, or all of the characters are faded, then the histogram will appear more concentrated.

With respect to text fading detection, if a physical medium includes text characters with different colors, then the mean ΔE for different color text characters may vary, and the histogram may become diverged. To address this aspect, because of the availability of the master image 106, the text fading detection module 118 may directly determine the mean ΔE between the scanned image 108 and the master image 106 for each character. For this comparison, the master image 106 may be first converted to scanner RGB.

If a physical medium includes a relatively small amount of fading, then the faded characters may not affect the overall histogram since they account for a relatively small population, but these faded characters may still be noticeable to human eyes. To address this aspect, the text fading detection module 118 may divide the physical medium into several blocks or strips, and locally evaluate the histogram for each block or strip instead of the entire physical medium. Therefore, when even a small number of text characters include fading, the local region histogram would still diverge.

With respect to local alignment for text fading detection, the text fading detection module 118 may determine the color difference for all of the text character pixels. In this regard, FIG. 8 illustrates a local alignment flow for text fading detection for the apparatus 100, according to an example of the present disclosure.

Figure 8:
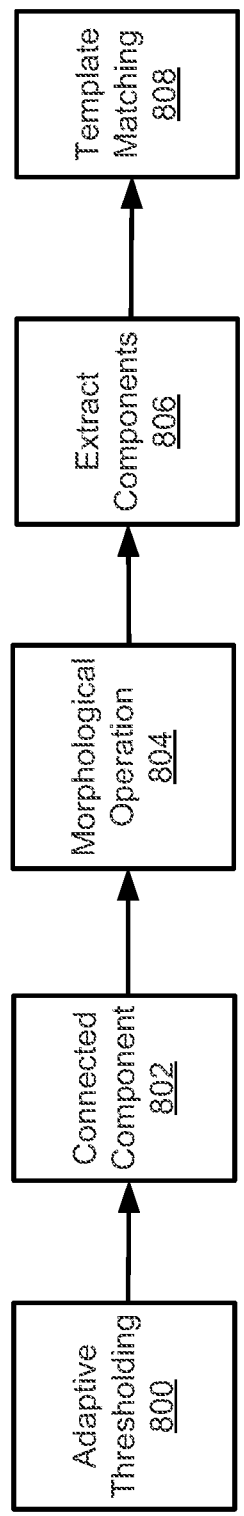
FIG. 8 illustrates a local alignment flow for text fading detection for the print quality diagnosis apparatus of FIG. 1, according to an example of the present disclosure.

Referring to FIG. 8, at block 800, the text fading detection module 118 may perform adaptive thresholding to binarize a gray image, separating text characters from the background. With respect to adaptive thresholding, the text fading detection module 118 may subtract from the pixel value the median value of the pixels in a local block, and compare the difference with a threshold. This comparison may establish the region of pixels that correspond to the printed text character. The output of FIG. 8 may represent a pixel shift that may be applied to the scanned image 108 to align each individual character in preparation for further analysis.

At block 802, the text fading detection module 118 may connect the pixels in the text characters by performing a connected component process. The connected components process may represent a technique for grouping pixels according to their association with a single text character. The connected components process may be used to extract information from each text character, such as size, height, width, etc. In this regard, the text fading detection module 118 may identify characters (i.e., letters) in both the master image 106 and the scanned image 108 via connected components.

At block 804, the text fading detection module 118 may remove noise from the registered image, for example, by performing a morphological operation on the registered image. The morphological operation may be described as a closing which fills in small isolated regions that should have been included in the character mask, but which failed to exceed the aforementioned threshold, and remove very small character regions that are due to noise. The text characters may be enlarged or reduced using morphological operations. Morphological operations may either add an additional layer of pixels to the outside or inside of the characters, or remove a layer of pixels around the characters. This serves the purpose to remove holes or gaps in a character, or removing dots that are not associated with a character.

At block 806, the text fading detection module 118 may extract text character components from the master image 106. The text character components may be identified by a global thresholding operation followed by application of the connected components process to group pixels corresponding to each separate character type. Further, these operations may be followed by a local thresholding operation within a bounding box including each connected component to further define boundaries of that connected component. The text character component may represent a list of the pixels corresponding to that particular text character. The text character components may include information such as area, height, width, perimeter length, pixel values, etc., associated with text characters.

For each of the text character components extracted at block 806, at block 808, the text fading detection module 118 may use the extracted text character component as a template to determine a match in the scanned image 108 (i.e., the scanned binary image) inside a localized range. Since a given character, such as the letter "e", for example, may occur at many locations within the scanned image 108, the geographical region of potential matches may be limited. In this manner, a letter "e" in the scanned image 108 is not matched with a different letter "e" in the master image 106. In this regard, the text fading detection module 118 may align the characters in the scanned image 108 to the characters in the master image 106. The searched range may depend on the accuracy of registration of the scanned image 108 and the master image 106. The search range may be determined by a training process using a representative set of master-target pairs of pages. The performance with different search ranges may be evaluated, and the search range that yields the best overall performance may be selected. Thus, with respect to block 808, the components extracted from each character may be used to determine if the characters match and are indeed the same characters. Each character in the scanned image 108 may be compared to a region in the master image 106. The region may be specified around the matching character with a window that does not fully include characters near that character. The two regions may be compared using a template matching technique as discussed above. The template matching technique may compare the regions with a sliding window, and the best overlapping window may be used for the text alignment in FIG. 9B.

Figures 9A, 9B:
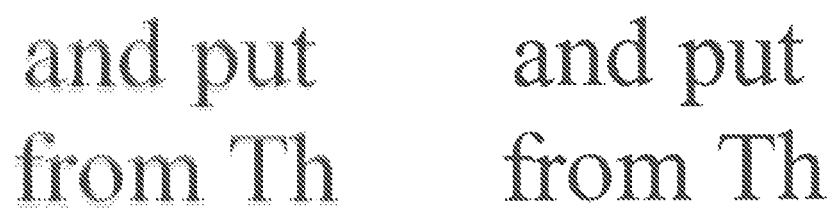

FIG. 9A illustrates text before alignment, and FIG. 9B illustrates text after alignment for the text fading detection of FIG. 8 for the apparatus 100, according to an example of the present disclosure.

Referring to FIG. 9B, with respect to local alignment performed by the text fading detection module 118, each character of the master image 106 is shown as being matched with a text character in the scanned image 108. At the completion of the local alignment process, a list of components of text characters may be generated, and each component may include a pixel list that may be used for pixel-wise color comparison by the text fading detection module 118. A component may refer to all of the pixels associated with a particular text character, as determined by the connected components process. With respect to referencing of these pixels, the pixels may be arranged in a list. Each row in such a list may include the row and column coordinates of the pixel. Each row may also include the value of the pixel at the row and column coordinates, expressed, for example, in terms of R, G, and B, or L*, a*, and b*.

With respect to color comparison, as discussed above, the text fading detection module 118 may utilize the metric ΔE, which represents the Euclidean distance between two points in L* b* color space. The pixel list extracted previously, which may be in scanner calibrated RGB, may need to be converted to L*a*b* first, and then ΔE may be determined for each pixel in the list between the master image 106 and the scanned image 108. The mean ΔE for each pair of components of text characters may indicate their perceptual difference on average. When a text character is faded, regardless of its color, the mean ΔE will be become relatively large.

With respect to mean ΔE determination, according to an example, $(R_i, G_i, B_i)$ may represent the $i_{th}$ pixel triple in $C_k$ (pixel list of the $K_{th}$ component in the master image 106, where i=1 . . . N, N is the number of pixel triples in $C_k$, k=1 . . . M, and, M is the number of components in the entire master image 106 (or a strip). Each $(R_i, G_i, B_i)$ and $(R'_i, G'_i, B'_i)$ triple may be converted to L*a*b* color space, which results in $(L^*_i, a^*_i, b^*_i)$ and $(L'^*_i, a'^*_i, b'^*_i)$. $(R'_i, G'_i, B'_i)$ may represent the $i_{th}$ pixel triple in $C'_k$ (pixel list of the component in the scanned image 108 that is template matched with the $K_{th}$ component in the master image 106). The color difference between $i_{th}$ triple pair may be represented as:

$$\Delta E_{ab}^* = \sqrt{(L_2^* - L_1^*)^2 + (a_2^* - a_1^*)^2 + (b_2^* - b_1^*)^2}$$

The mean ΔE of all the N pixels in $C_k$ may be represented as:

$$u\Delta E_{ab}^* = \frac{1}{N}\sum_{i=1}^{N}\Delta E_{ab}^* i$$

The mean ΔE may represent, on average, how one component (or text character) in the master image 106 is perceptually different from the template matched component in the scanned image 108.

Figure 10B:
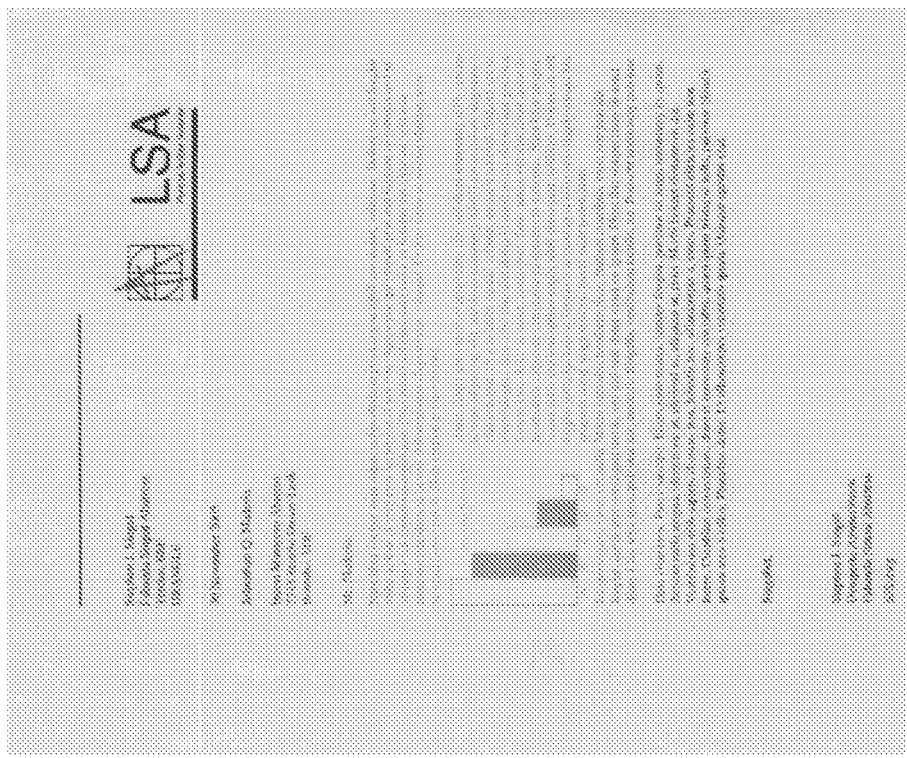
FIG. 10B illustrates a scanned image with fading for illustrating operation of the print quality diagnosis apparatus of FIG. 1, according to an example of the present disclosure.
Figure 10A:
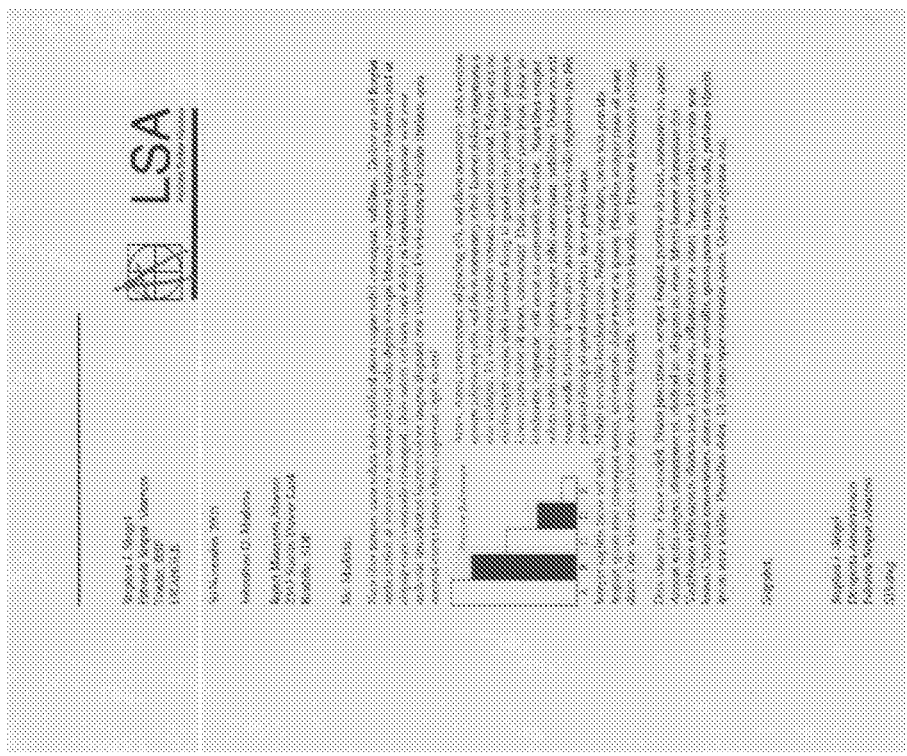
FIG. 10A illustrates a scanned image without fading.

FIG. 10A illustrates a scanned image without fading, and FIG. 10B illustrates a scanned image with fading for illustrating operation of the apparatus 100, according to an example of the present disclosure. Further, FIG. 11A illustrates a histogram for the non-faded scanned image of FIG. 10A, and FIG. 11B illustrates a histogram for the faded scanned image of FIG. 10B for illustrating operation of the apparatus 100, according to an example of the present disclosure.

Figure 11A:
FIG. 11A illustrates a histogram for the non-faded scanned image of FIG. 10A.
Figure 11B:
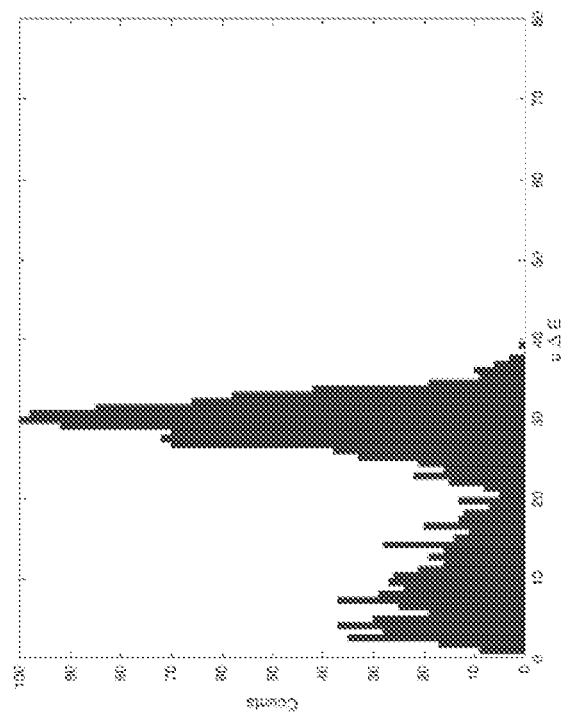
FIG. 11B illustrates a histogram for the faded scanned image of FIG. 10B for illustrating operation of the print quality diagnosis apparatus of FIG. 1, according to an example of the present disclosure.

Referring to FIGS. 10A and 11A, if the histogram of the mean ΔE of all the characters is plotted, an unfaded physical medium such as the physical medium shown in FIG. 10A will exhibit a relatively narrow spread histogram as shown in FIG. 11A. In contrast, when fading exists, such as the sample of FIG. 10B, the histogram will spread out as shown in FIG. 11B, and further, the mean will shift to the right (i.e., include a larger value). However, the histogram may become less dispersed as well when the entire physical medium is faded. Therefore, the mean of the mean ΔE may be used as a measure of the fading level. For example, for a relatively narrow strip of text characters that are faded, the mean of the mean ΔE in a large degree may be dependent on the larger population of non-faded text characters. The fading may be more readily detected if a physical medium is divided into several small regions, for example strips, and then the mean of the mean ΔE is analyzed locally for each region.

FIGS. 12A and 12B, 13A and 13B, 14A and 14B, and 15A and 15B, respectively illustrate a scanned image and an associated histogram for illustrating operation of the apparatus 100, according to an example of the present disclosure.

Referring to FIGS. 12A, 13A, 14A, and 15A, a series of scanned images with increasing levels of text fading are shown. For visualization purpose, all of the scanned images are divided into four horizontal strips. However, the scanned images may be divided into any number of strips (e.g., eight strips or more depending on the type of image being analyzed). The histogram plotted to the right of each scanned image (e.g., FIGS. 12B, 13B, 14B, and 15B) may represent the distribution of the mean ΔE for each character in each strip compared with a master image, which is not shown.

Figure 12B:
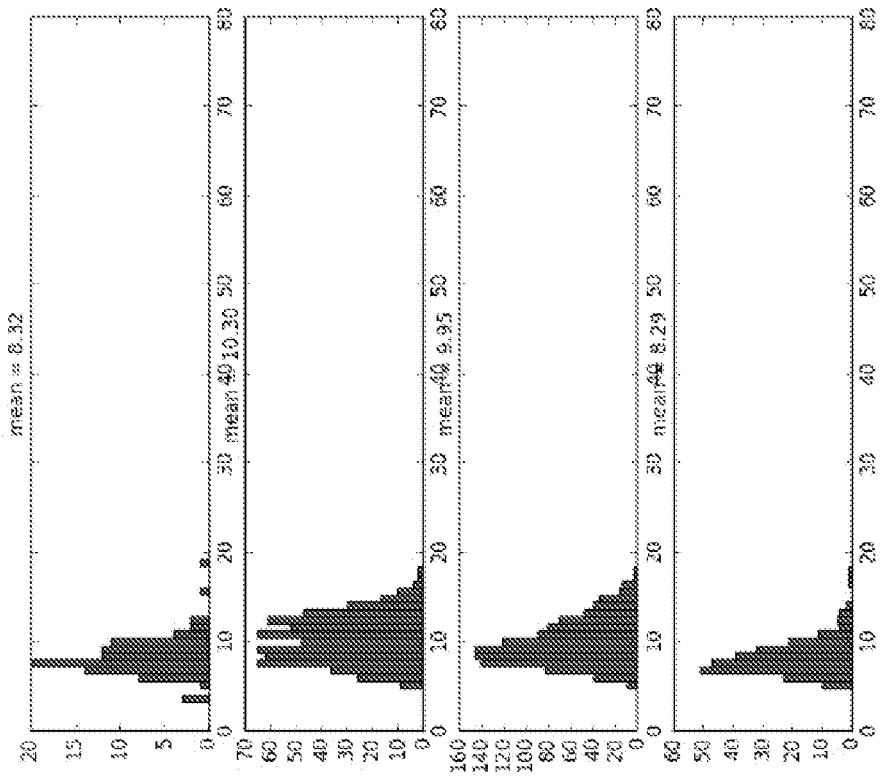
FIGS. 12A and 12B, 13A and 13B, 14A and 14B, and 15A and 15B, respectively illustrate a scanned image and an associated histogram for illustrating operation of the print quality diagnosis apparatus of FIG. 1, according to an example of the present disclosure.
Figure 12A:
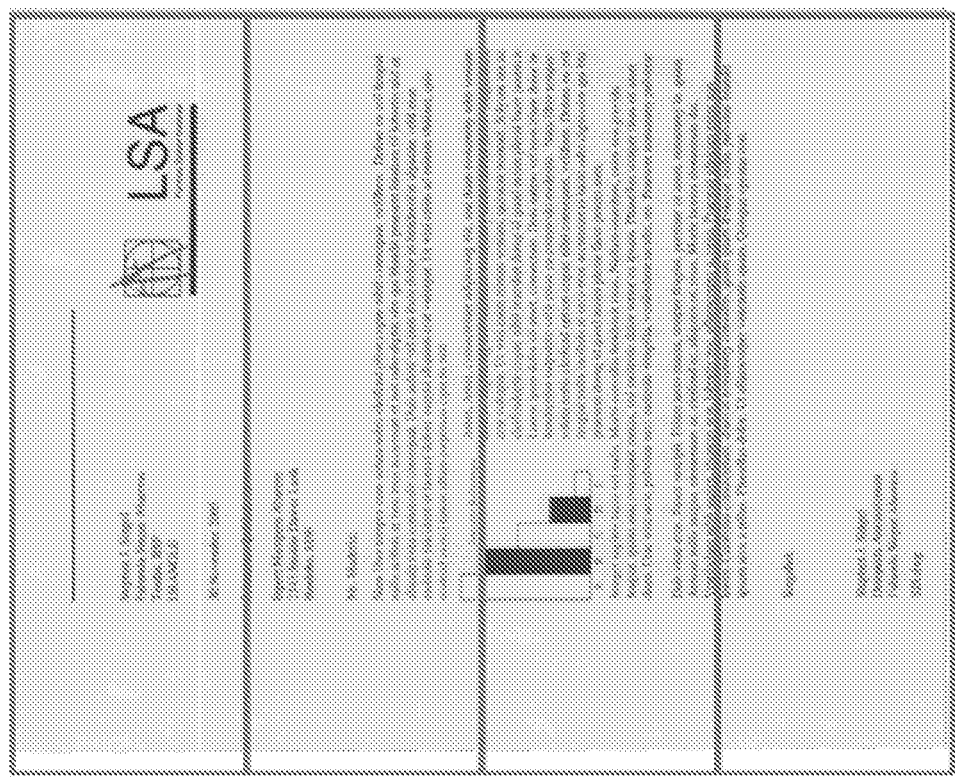

Referring to FIGS. 12A and 12B, the scanned image of FIG. 12A is an unfaded image (i.e., an image of an unfaded physical medium), and therefore, the associated histograms of FIG. 12B for the four strips shown in FIG. 12A are relatively narrow (i.e., not spread out) and include peaks that are located at their means. In this case, the means are all less than a specified threshold, such as approximately 12, which indicates that the print quality of the printed physical medium 110 has not reduced.

Figure 13B:
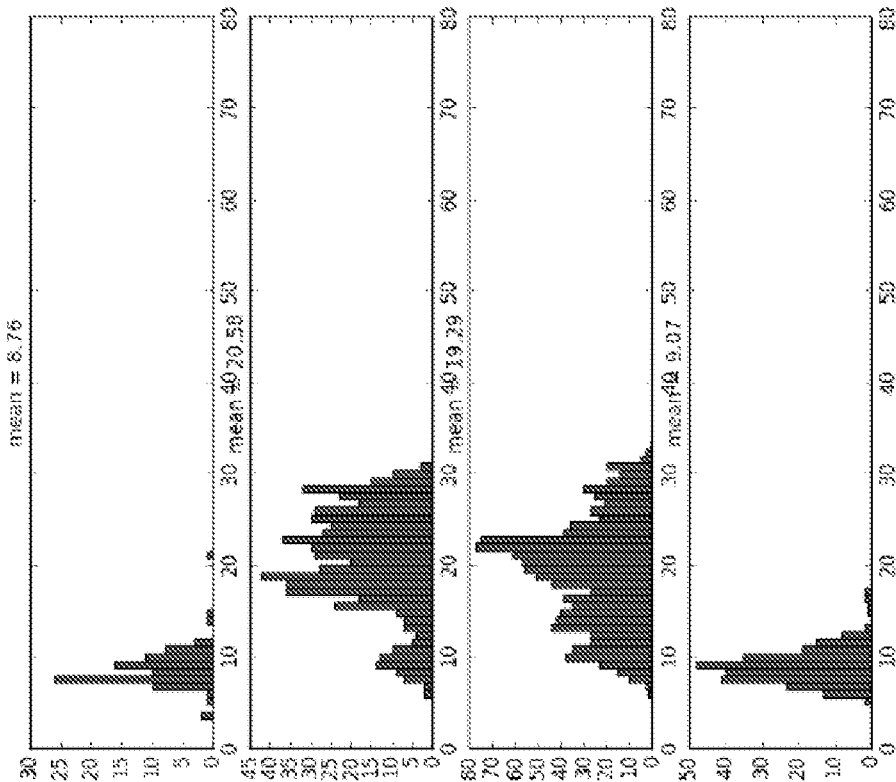
Figure 13A:
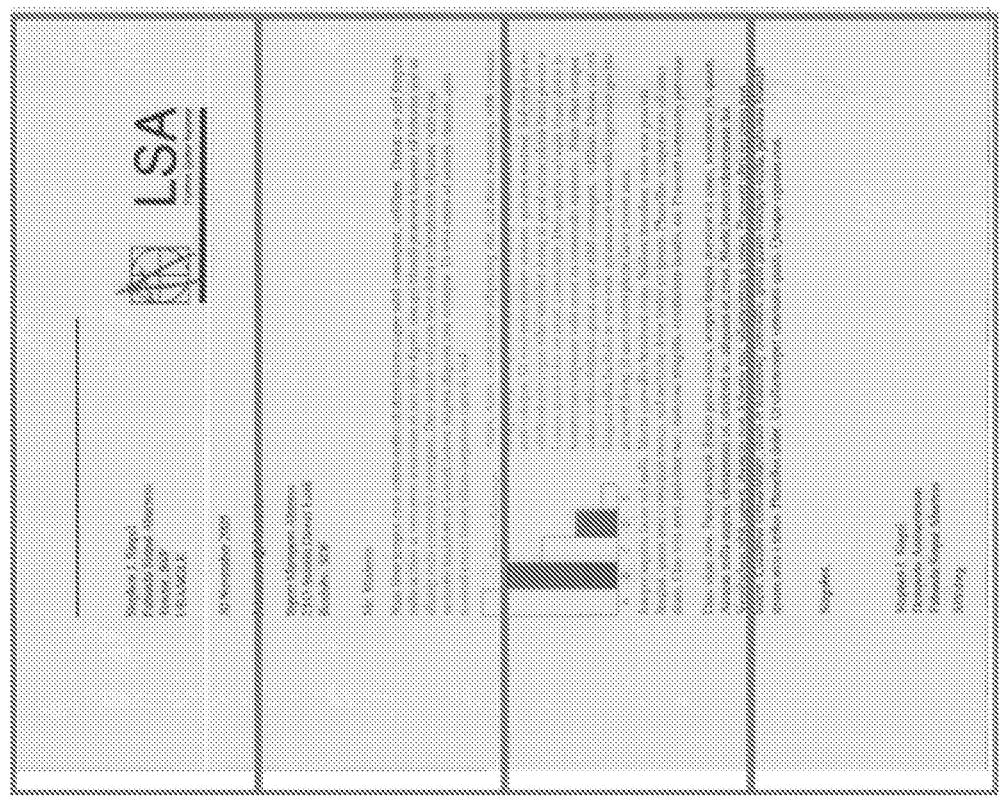

Referring to FIGS. 13A and 13B, the scanned image of FIG. 13A includes fading in the middle two strips, and thus the middle two histograms of FIG. 13B begin to spread to the right (e.g., include a relatively wide spread relative to a specified spread, such as the corresponding spread of FIG. 12B) and their means become larger. In this case, the means of the middle two strips are greater than a specified threshold, such as approximately 12, which indicates that the print quality of the printed physical medium 110 is reduced. The reduction of the print quality of the printed physical medium 110 may be determined as a ratio (or another factor) of a mean to a specified mean threshold. For the top and bottom strips that include virtually no fading, their histograms remain relatively unchanged.

Figure 14B:
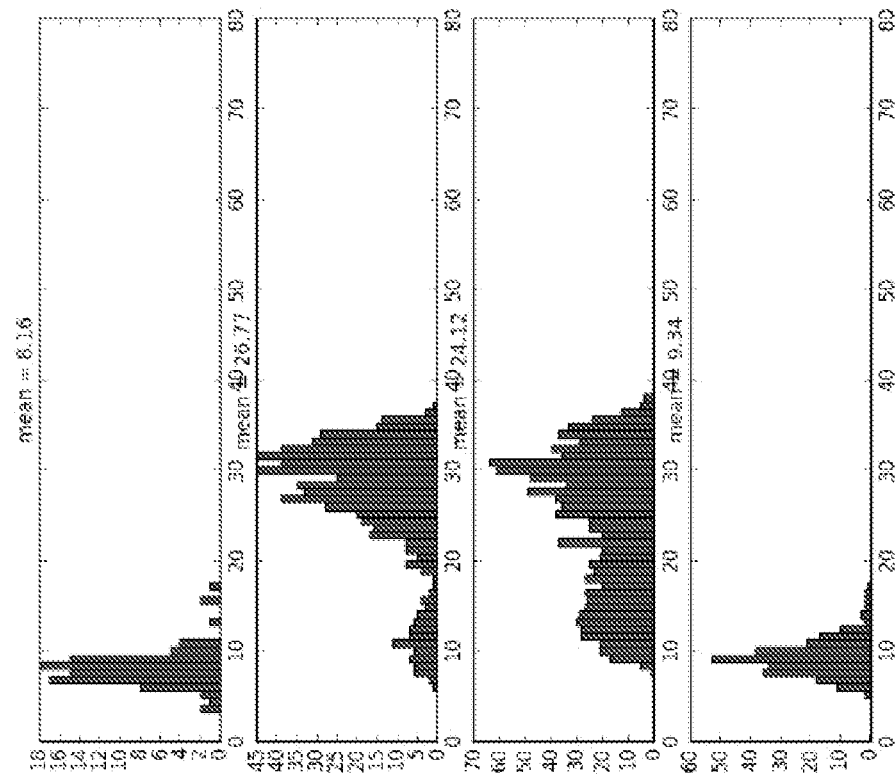
Figure 14A:
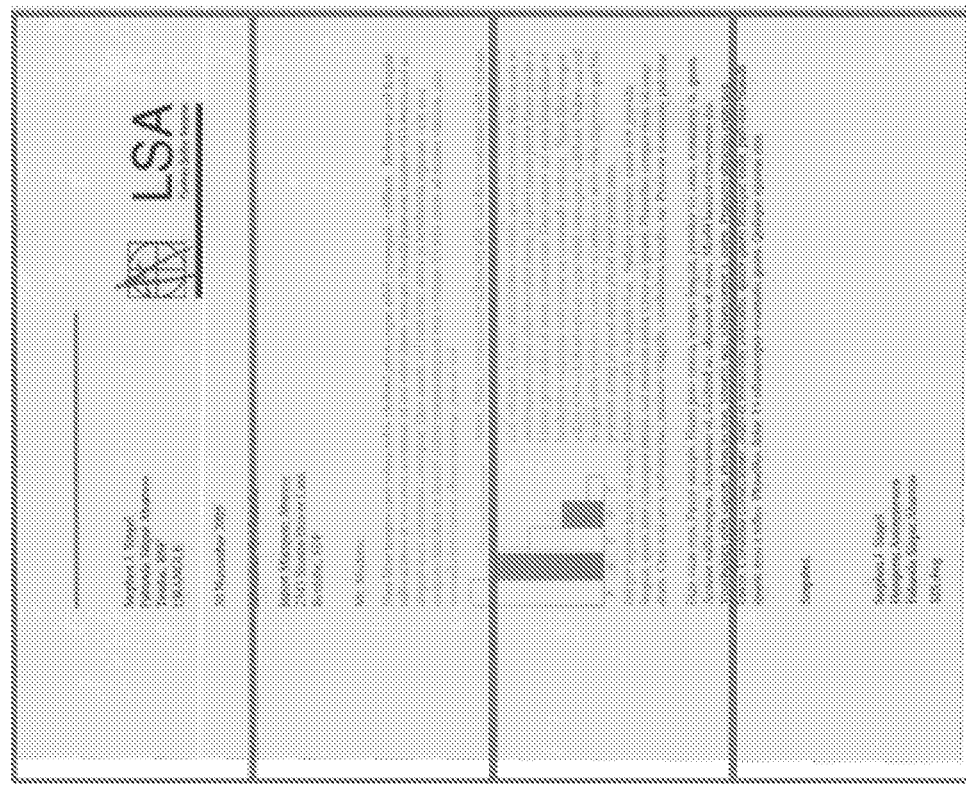

Referring to FIGS. 14A and 14B, the scanned image of FIG. 14A includes increased fading in the middle two strips (compared to FIG. 13A), and thus the middle two histograms of FIG. 14B begin to spread even further to the right and their means become even larger compared to FIG. 13B. For the top and bottom strips that include virtually no fading, their histograms remain relatively unchanged.

Figure 15B:
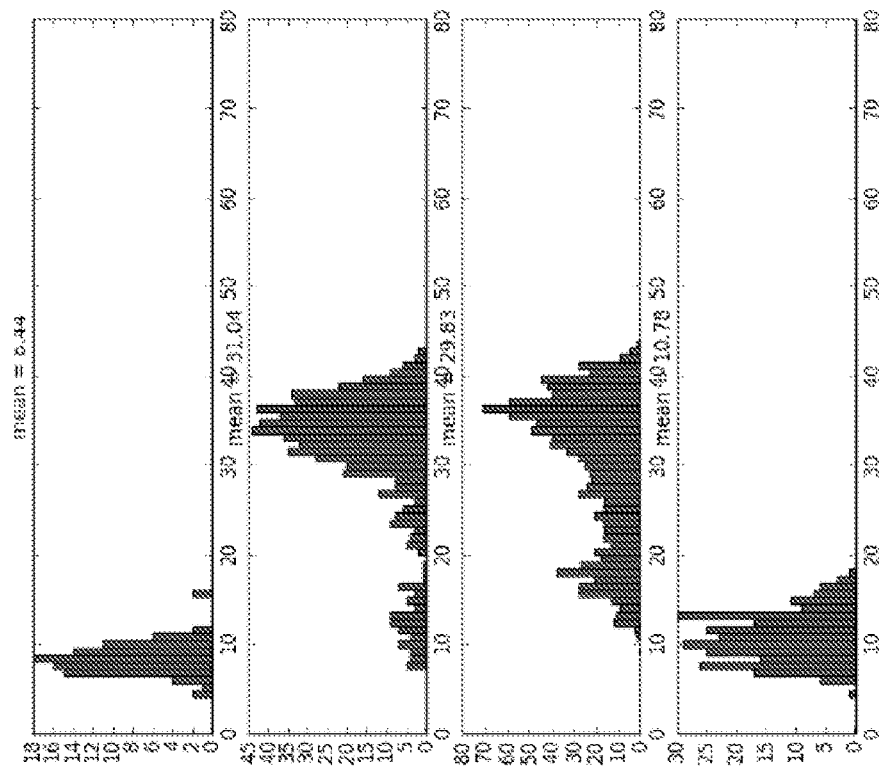
Figure 15A:
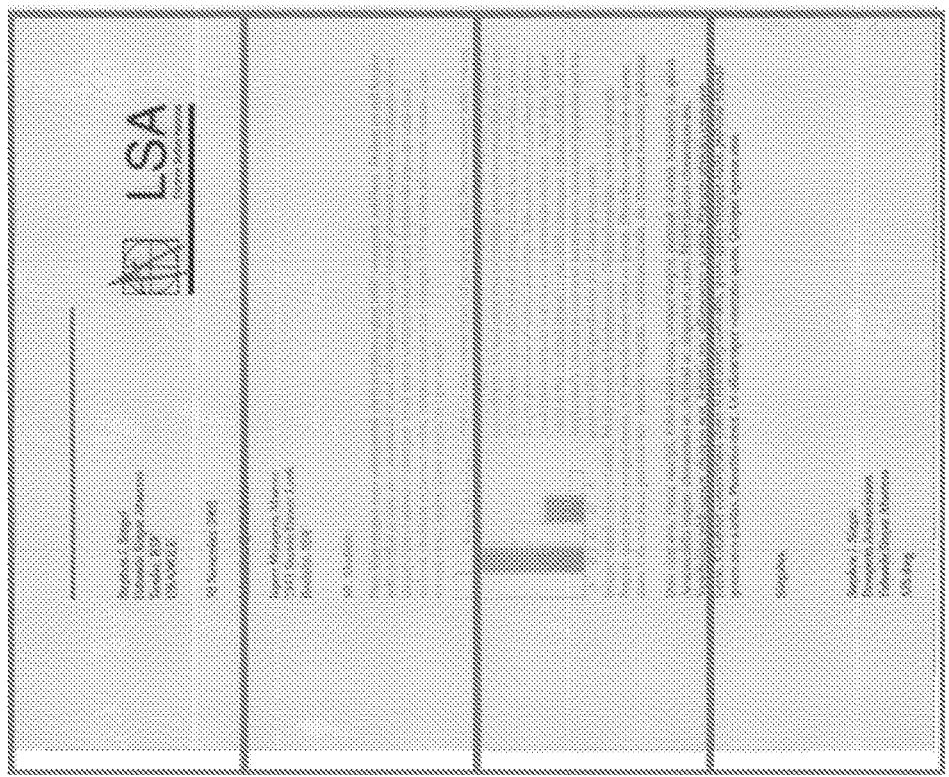

Referring to FIGS. 15A and 15B, the scanned image of FIG. 15A includes increased fading in the middle two strips (compared to FIGS. 13A and 14A) and some increase in fading in the top and bottom strips (compared to FIGS. 13A and 14A). In this regard, the middle two histograms begin to spread even further to the right and their means become even larger compared to FIGS. 13B and 14B. For the top and bottom strips that include increased fading, their histograms begin to spread to the right and their means become larger compared to FIGS. 12B, 13B, and 14B.

Figure 16:
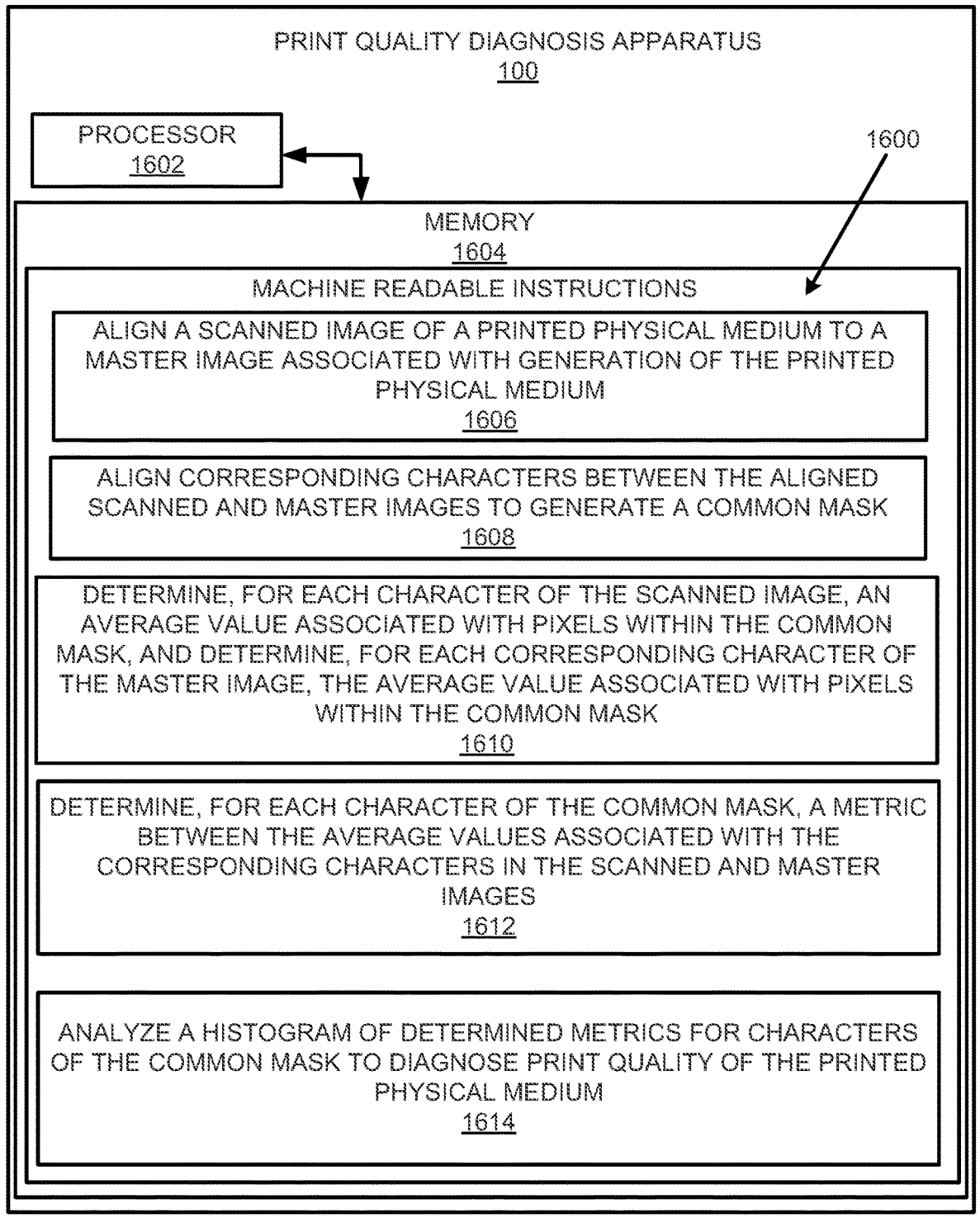
FIG. 16 illustrates a block diagram for print quality diagnosis, according to an example of the present disclosure.
Figure 18:
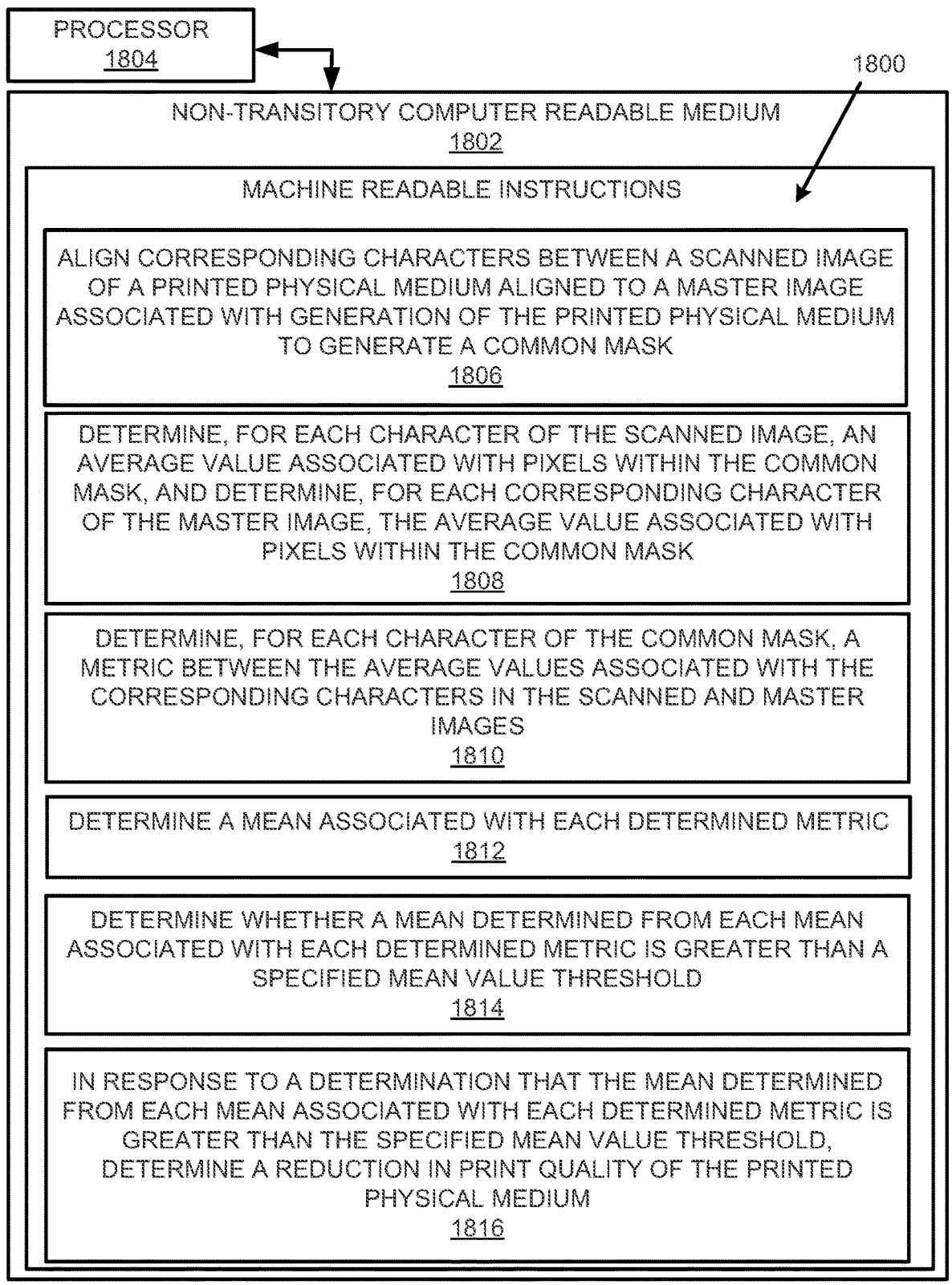
FIG. 18 illustrates a further block diagram for print quality diagnosis, according to an example of the present disclosure.

FIGS. 16-18 respectively illustrate a block diagram 1600, a flowchart of a method 1700, and a further block diagram 1800 for print quality diagnosis, according to examples. The block diagram 1600, the method 1700, and the block diagram 1800 may be implemented on the apparatus 100 described above with reference to FIG. 1 by way of example and not limitation. The block diagram 1600, the method 1700, and the block diagram 1800 may be practiced in other apparatus. In addition to showing the block diagram 1600, FIG. 16 shows hardware of the apparatus 100 that may execute the instructions of the block diagram 1600. The hardware may include a processor 1602, and a memory 1604 storing machine readable instructions that when executed by the processor cause the processor to perform the instructions of the block diagram 1600. The memory 1604 may represent a non-transitory computer readable medium. FIG. 17 may represent a method for print quality diagnosis, and the steps of the method. FIG. 18 may represent a non-transitory computer readable medium 1802 having stored thereon machine readable instructions to provide print quality diagnosis. The machine readable instructions, when executed, cause a processor 1804 to perform the instructions of the block diagram 1800 also shown in FIG. 18.

The processor 1602 of FIG. 16 and/or the processor 1804 of FIG. 18 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1802 of FIG. 18), such as hardware storage devices (e.g., RAM (random access memory), ROM (read only memory), EPROM (erasable, programmable ROM), EEPROM (electrically erasable, programmable ROM), hard drives, and flash memory). The memory 1604 may include a RAM, where the machine readable instructions and data for a processor may reside during runtime.

Referring to FIGS. 1-16, and particularly to the block diagram 1600 shown in FIG. 16, at block 1606, the memory 1604 may include instructions to align (e.g., by the image registration module 116) a scanned image 108 of a printed physical medium 110 to a master image 106 associated with generation of the printed physical medium 110.

At block 1608, the memory 1604 may include instructions to align (e.g., by the text fading detection module 118) corresponding characters between the aligned scanned and master images to generate a common mask 120.

At block 1610, the memory 1604 may include instructions to determine (e.g., by the text fading detection module 118), for each character of the scanned image 108, an average value (e.g., average L*a*b*) associated with pixels within the common mask 120, and determine, for each corresponding character of the master image 106, the average value associated with pixels within the common mask 120.

At block 1612, the memory 1604 may include instructions to determine (e.g., by the text fading detection module 118), for each character of the common mask 120, a metric (e.g., ΔE) between the average values associated with the corresponding characters in the scanned and master images.

At block 1614, the memory 1604 may include instructions to analyze (e.g., by the print quality analysis module 122) a histogram (e.g., as disclosed herein with reference to FIGS. 10A-15B) of determined metrics for characters of the common mask 120 to diagnose print quality of the printed physical medium 110.

According to an example, the machine readable instructions to align the scanned image 108 of the printed physical medium 110 to the master image 106 associated with generation of the printed physical medium 110 further comprise machine readable instructions to identify a plurality of feature points for the scanned and master images, and extract, for each of the plurality of feature points, feature descriptors. Further, the machine readable instructions may cause a processor to match the extracted feature descriptors that are disposed within a specified distance between the scanned and master images to generate matched feature pairs, generate a transformation matrix based on the matched feature pairs, and apply the transformation matrix to the scanned image 108 to align the scanned image 108 of the printed physical medium 110 to the master image 106 associated with generation of the printed physical medium 110 (e.g., see discussion with respect to FIG. 3).

According to an example, the machine readable instructions to align corresponding characters between the aligned scanned and master images to generate the common mask 120 further comprise machine readable instructions to identify characters in the scanned and master images, match corresponding identified characters in the scanned and master images, and align corresponding matched characters between the aligned scanned and master images to generate the common mask 120 (e.g., see discussion with respect to FIG. 8).

According to an example, the machine readable instructions to determine, for each character of the scanned image 108, the average value associated with pixels within the common mask 120, and determine, for each corresponding character of the master image 106, the average value associated with pixels within the common mask 120 further comprise machine readable instructions to determine, for each character of the scanned image 108, the average value that includes L*a*b* associated with pixels within the common mask 120, where L* represents lightness, a* represents red-green, and b* represents yellow-blue, and determine, for each corresponding character of the master image 106, the average value that includes L*a*b* associated with pixels within the common mask 120 (e.g., see discussion with respect to FIG. 8).

According to an example, the machine readable instructions to determine, for each character of the common mask 120, the metric between the average values associated with the corresponding characters in the scanned and master images further comprise machine readable instructions to determine, for each character of the common mask 120, the metric that includes an Euclidean distance between the average values associated with the corresponding characters in the scanned and master images (e.g., see discussion with respect to FIG. 8).

According to an example, the machine readable instructions to analyze the histogram of determined metrics for characters of the common mask 120 to diagnose the print quality of the printed physical medium 110 further comprise machine readable instructions to cause the processor to divide the printed physical medium 110 into a plurality of sections, generate, for each section of the plurality of sections, a histogram of the determined metrics, and analyze the histogram of the determined metrics for a section of the plurality of sections to diagnose the print quality of the section of the plurality of sections of the printed physical medium 110 (e.g., see discussion with respect to FIGS. 8 and 10A-15B).

According to an example, the machine readable instructions to analyze the histogram of determined metrics for characters of the common mask 120 to diagnose the print quality of the printed physical medium 110 further comprise machine readable instructions to determine whether the histogram of the determined metrics includes a relatively narrow spread or a relatively wide spread relative to a specified spread of the histogram, and in response to a determination that the histogram of the determined metrics includes the relatively wide spread, determine a reduction in the print quality of the printed physical medium 110 (e.g., see discussion with respect to FIGS. 8 and 10A-15B).

According to an example, the machine readable instructions to analyze the histogram of determined metrics for characters of the common mask 120 to diagnose the print quality of the printed physical medium 110 further comprise machine readable instructions to determine a mean associated with each of the determined metrics (e.g., mean ΔE), determine whether a mean (e.g., mean of the mean ΔE) determined from each mean associated with each of the determined metrics is greater than a specified mean value threshold, and in response to a determination that the mean determined from each mean associated with each of the determined metrics is greater than the specified mean value threshold, determine a reduction in the print quality of the printed physical medium 110 (e.g., see discussion with respect to FIGS. 8 and 10A-15B).

Referring to FIGS. 1-3, and 17, and particularly FIG. 17, for the method 1700, at block 1702, the method may include aligning (e.g., by the text fading detection module 118) corresponding characters between a scanned image 108 of a printed physical medium 110 aligned to a master image 106 associated with generation of the printed physical medium 110 to generate a common mask 120.

At block 1704, the method may include determining (e.g., by the text fading detection module 118), for each character of the scanned image 108, an average value associated with pixels within the common mask 120, and determining, for each corresponding character of the master image 106, the average value associated with pixels within the common mask 120.

At block 1706, the method may include determining (e.g., by the text fading detection module 118), for each character of the common mask 120, a metric between the average values associated with the corresponding characters in the scanned and master images.

At block 1708, the method may include dividing (e.g., by the text fading detection module 118) the printed physical medium 110 into a plurality of sections.

At block 1710, the method may include generating (e.g., by the text fading detection module 118), for each section of the plurality of sections, a histogram of the determined metrics.

At block 1712, the method may include analyzing (e.g., by the print quality analysis module 122) the histogram of the determined metrics for a section of the plurality of sections to diagnose print quality of the section.

Referring to FIGS. 1-3, and 18, and particularly FIG. 18, for the block diagram 1800, at block 1806, the non-transitory computer readable medium 1802 may include instructions to align (e.g., by the text fading detection module 118) corresponding characters between a scanned image 108 of a printed physical medium 110 aligned to a master image 106 associated with generation of the printed physical medium 110 to generate a common mask 120.

At block 1808, the non-transitory computer readable medium 1802 may include instructions to determine (e.g., by the text fading detection module 118), for each character of the scanned image 108, an average value associated with pixels within the common mask 120, and determine, for each corresponding character of the master image 106, the average value associated with pixels within the common mask 120.

At block 1810, the non-transitory computer readable medium 1802 may include instructions to determine (e.g., by the text fading detection module 118), for each character of the common mask 120, a metric between the average values associated with the corresponding characters in the scanned and master images.

At block 1812, the non-transitory computer readable medium 1802 may include instructions to determine (e.g., by the text fading detection module 118) a mean associated with each determined metric.

At block 1814, the non-transitory computer readable medium 1802 may include instructions to determine (e.g., by the print quality analysis module 122) whether a mean determined from each mean associated with each determined metric is greater than a specified mean value threshold.

At block 1816, in response to a determination that the mean determined from each mean associated with each determined metric is greater than the specified mean value threshold, the non-transitory computer readable medium 1802 may include instructions to determine (e.g., by the print quality analysis module 122) a reduction in print quality of the printed physical medium 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A print quality diagnosis apparatus comprising:
    a processor; and
    a memory storing machine readable instructions that when executed by the processor cause the processor to:
        align a scanned image of a printed physical medium to a master image associated with generation of the printed physical medium;
        align corresponding characters between the aligned scanned and master images to generate a common mask;
        determine, for each character of the scanned image, an average value associated with pixels within the common mask, and determine, for each corresponding character of the master image, the average value associated with pixels within the common mask;
        determine, for each character of the common mask, a metric between the average values associated with the corresponding characters in the scanned and master images, wherein the metric between the average values comprises a Euclidean distance between the average values associated with the corresponding characters in the scanned and master images; and analyze a histogram of determined metrics for characters of the common mask to diagnose print quality of the printed physical medium.

2. The apparatus according to claim 1, wherein the machine readable instructions to align the scanned image of the printed physical medium to the master image associated with generation of the printed physical medium further comprise machine readable instructions to cause the processor to:
identify a plurality of feature points for the scanned and master images;
extract, for each of the plurality of feature points, feature descriptors;
match the extracted feature descriptors that are disposed within a specified distance between the scanned and master images to generate matched feature pairs;
generate a transformation matrix based on the matched feature pairs; and
apply the transformation matrix to the scanned image to align the scanned image of the printed physical medium to the master image associated with generation of the printed physical medium.

3. The apparatus according to claim 1, wherein the machine readable instructions to align corresponding characters between the aligned scanned and master images to generate the common mask further comprise machine readable instructions to cause the processor to:
identify characters in the scanned and master images;
match corresponding identified characters in the scanned and master images; and
align corresponding matched characters between the aligned scanned and master images to generate the common mask.

4. The apparatus according to claim 1, wherein the machine readable instructions to determine, for each character of the scanned image, the average value associated with pixels within the common mask, and determine, for each corresponding character of the master image, the average value associated with pixels within the common mask further comprise machine readable instructions to cause the processor to:
determine, for each character of the scanned image, the average value that includes L*a*b* associated with pixels within the common mask, where L* represents lightness, a* represents red-green, and b* represents yellow-blue; and
determine, for each corresponding character of the master image, the average value that includes L*a*b* associated with pixels within the common mask.

5. The apparatus according to claim 1, wherein the machine readable instructions to analyze the histogram of determined metrics for characters of the common mask to diagnose the print quality of the printed physical medium further comprise machine readable instructions to cause the processor to:
divide the printed physical medium into a plurality of sections;
generate, for each section of the plurality of sections, a histogram of the determined metrics; and
analyze the histogram of the determined metrics for a section of the plurality of sections to diagnose the print quality of the section of the plurality of sections of the printed physical medium.

6. The apparatus according to claim 1, wherein the machine readable instructions to analyze the histogram of determined metrics for characters of the common mask to diagnose the print quality of the printed physical medium further comprise machine readable instructions to cause the processor to:
determine whether the histogram of the determined metrics includes a relatively narrow spread or a relatively wide spread relative to a specified spread of the histogram; and
in response to a determination that the histogram of the determined metrics includes the relatively wide spread, determine a reduction in the print quality of the printed physical medium.

7. The apparatus according to claim 1, wherein the machine readable instructions to analyze the histogram of determined metrics for characters of the common mask to diagnose the print quality of the printed physical medium further comprise machine readable instructions to cause the processor to:
determine a mean associated with each of the determined metrics;
determine whether a mean determined from each mean associated with each of the determined metrics is greater than a specified mean value threshold; and
in response to a determination that the mean determined from each mean associated with each of the determined metrics is greater than the specified mean value threshold, determine a reduction in the print quality of the printed physical medium.

8. A method for print quality diagnosis comprising:
aligning, by a processor, corresponding characters between a scanned image of a printed physical medium aligned to a master image, associated with generation of the printed physical medium to generate a common mask;
determining, for each character of the scanned image, an average value associated with pixels within the common mask, and determining, for each corresponding character of the master image, the average value associated with pixels within the common mask;
determining, for each character of the common mask, a metric between the average values associated with the corresponding characters in the scanned and master images, wherein the metric between the average values comprises a Euclidean distance between the average values associated with the corresponding characters in the scanned and master images;
dividing the printed physical medium into a plurality of sections;
generating, for each section of the plurality of sections, a histogram of the determined metrics; and
analyzing the histogram of the determined metrics for a section of the plurality of sections to diagnose print quality of the section.

9. The method according to claim 8, wherein aligning corresponding characters between the scanned image of the printed physical medium aligned to the master image associated with generation of the printed physical medium to generate the common mask further comprises:
identifying characters in the scanned and master images;
matching corresponding identified characters in the scanned and master images; and
aligning corresponding matched characters between the aligned scanned, and master images to generate the common mask.

10. The method according to claim 8, wherein determining, for each character of the scanned image, the average value associated with pixels within the common mask, and determining, for each corresponding character of the master image, the average value associated with pixels within the common mask further comprises:

determining, for each character of the scanned image, the average value that includes L*a*b* associated with pixels within the common mask, where L* represents lightness, a* represents red-green, and b* represents yellow-blue; and determining, for each corresponding character of the master image, the average value that includes L*a*b* associated with pixels within the common mask.

11. A non-transitory computer readable medium having stored thereon machine readable instructions to provide print quality diagnosis, the machine readable instructions, when executed, cause a processor to:

align corresponding characters between a scanned image of a printed physical medium aligned to a master image associated with generation of the printed physical medium to generate a common mask;

determine, for each character of the scanned image, an average value associated with pixels within the common mask, and determine, for each corresponding character of the master image, the average value associated with pixels within the common mask;

determine, for each character of the common mask, a metric between the average values associated with the corresponding characters in the scanned and master images, wherein the metric between the average values comprises a Euclidean distance between the average values associated with the corresponding characters in the scanned and master images;

determine a mean associated with each determined metric;

determine whether a mean determined from each mean associated with each determined metric is greater than a specified mean value threshold; and in response to a determination that the mean determined from each mean associated with each determined metric is greater than the specified mean value threshold, determine a reduction in print quality of the printed physical medium.

12. The non-transitory computer readable medium according to claim 11, further comprising machine readable instructions, when executed, further cause the processor to:

analyze a histogram of the determined metrics for characters of the common mask to diagnose the print quality of the printed physical medium.

13. The non-transitory computer readable medium according to claim 11, further comprising machine readable instructions, when executed, further cause the processor to:

divide the printed physical medium into a plurality of sections;

generate, for each section of the plurality of sections, a histogram of determined metrics for characters of the common mask; and analyze the histogram of the determined metrics for a section of the plurality of sections to diagnose the print quality of the section of the plurality of sections of the printed physical medium.

14. The non-transitory computer readable medium according to claim 11, further comprising machine readable instructions, when executed, further cause the processor to:

determine whether a histogram of the determined metrics for characters of the common mask includes a relatively narrow spread or a relatively wide spread relative to a specified spread of the histogram; and in response to a determination that the histogram of the determined metrics includes the relatively wide spread, determine the reduction in the print quality of the printed physical medium.

\* \* \* \* \*